(12) United States Patent
Son et al.

(10) Patent No.: US 11,625,942 B2
(45) Date of Patent: *Apr. 11, 2023

(54) METHOD OF GENERATING FINGERPRINT IMAGE AND FINGERPRINT SENSOR

(71) Applicant: SAMSUNG ELECTRONICS CO., LTD., Suwon-si (KR)

(72) Inventors: Kyunghyun Son, Seongnam-si (KR); Jaechul Park, Yongin-si (KR); Jinmyoung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,202

(22) Filed: Dec. 23, 2021

(65) Prior Publication Data

US 2022/0114830 A1    Apr. 14, 2022

Related U.S. Application Data

(63) Continuation of application No. 16/880,435, filed on May 21, 2020, now Pat. No. 11,227,136.

(30) Foreign Application Priority Data

Oct. 24, 2019   (KR) .................. 10-2019-0133271

(51) Int. Cl.
  *G06K 9/20*   (2006.01)
  *G06V 40/13*  (2022.01)
  *G06F 21/32*  (2013.01)
(52) U.S. Cl.
  CPC .......... *G06V 40/1306* (2022.01); *G06F 21/32* (2013.01)

(58) Field of Classification Search
  CPC ........... G06V 40/1306; G06V 40/12–40/1394
  See application file for complete search history.

(56) References Cited

U.S. PATENT DOCUMENTS

| 6,438,257 B1* | 8/2002 | Morimura .......... G06V 40/1306 382/125 |
| 10,366,270 B2 | 7/2019 | Zhang et al. |

(Continued)

FOREIGN PATENT DOCUMENTS

| KR | 10-2017-0017588 A | 2/2017 |
| KR | 10-2017-0116756 A | 10/2017 |

(Continued)

OTHER PUBLICATIONS

Communication dated Nov. 23, 2020, issued by the European Patent Office in counterpart European Application No. 20180452.3.

*Primary Examiner* — Brian Werner
(74) *Attorney, Agent, or Firm* — Sughrue Mion, PLLC

(57) ABSTRACT

A method of generating a finger image includes determining a quantity of electric charge to be removed from each of a plurality of detection circuits connected to a fingerprint sensor, based on an amplifier characteristic of each of the plurality of detection circuits; obtaining a second electrical quantity by removing the quantity of electric charge from a first electrical quantity that is input to each of the plurality of detection circuits; integrating the second electrical quantity to obtain an integrated value; and generating the fingerprint image based on comparison between the integrated value of the second electrical quantity and a predetermined threshold value.

9 Claims, 11 Drawing Sheets

(56) References Cited

U.S. PATENT DOCUMENTS

| 2005/0031175 | A1 | 2/2005 | Hara et al. |
| 2017/0323134 | A1 | 11/2017 | Yeo et al. |
| 2018/0164950 | A1 | 6/2018 | Kang et al. |
| 2019/0138782 | A1 | 5/2019 | Zhang |

FOREIGN PATENT DOCUMENTS

| KR | 10-2018-0065971 A | 6/2018 |
| WO | 2019/062810 A1 | 4/2019 |
| WO | 2019/062932 A1 | 4/2019 |

\* cited by examiner

FIG. 8

| CURRENT AMOUNT (i) | OPERATION TIME (T) | QUANTITY OF ELECTRIC CHARGE (Q) |
|---|---|---|
| 11 | 14 | 6.16 |
| 14 | 11 | 6.16 |
| 12 | 13 | 6.24 |
| 13 | 12 | 6.24 |
| 10 | 16 | 6.4 |
| 16 | 10 | 6.4 |
| 11 | 15 | 6.6 |
| 15 | 11 | 6.6 |
| 12 | 14 | 6.72 |
| 14 | 12 | 6.72 |
| 13 | 13 | 6.76 |
| 11 | 16 | 7.04 |
| 16 | 11 | 7.04 |
| 12 | 15 | 7.2 |
| 15 | 12 | 7.2 |
| 13 | 14 | 7.28 |
| 14 | 13 | 7.28 |
| 12 | 16 | 7.68 |
| 16 | 12 | 7.68 |

FIRST STEP ADJUSTMENT

SECOND STEP ADJUSTMENT

METHOD OF GENERATING FINGERPRINT IMAGE AND FINGERPRINT SENSOR

CROSS-REFERENCE TO RELATED APPLICATION

This application is a continuation application of U.S. application Ser. No. 16/880,435, filed May 21, 2020, claims priority to Korean Patent Application No. 10-2019-0133271, filed on Oct. 24, 2019 in the Korean Intellectual Property Office, the disclosures of which are incorporated herein by reference in their entireties.

BACKGROUND

1. Field

Apparatuses and methods consistent with example embodiments relate to generating a fingerprint image and a fingerprint sensor.

2. Description of Related Art

Demand for personal authentication using unique characteristics of a person such as fingerprints, voice, face, hand, or iris has gradually expanded. A personal authentication function is mainly used for banking devices, access control devices, mobile devices, or laptop computers. Recently, as mobile phones such as smartphones have been widely distributed, a fingerprint recognition apparatus for personal authentication is employed to protect much security information stored in a smartphone.

SUMMARY

Example embodiments provide a method of generating a fingerprint image, fingerprint sensor, and a computer-readable recording medium having recorded thereon a program for executing the method. The technical problem to be solved is not limited to the above technical problems, and other technical problems may exist.

Additional aspects will be set forth in part in the description which follows and, in part, will be apparent from the description, or may be learned by practice of the presented embodiments of the disclosure.

According to an aspect of an example embodiment, there is provided a method of generating a fingerprint image, including: determining a quantity of electric charge to be removed from each of a plurality of detection circuits connected to a fingerprint sensor, based on an amplifier characteristic of each of the plurality of detection circuits; obtaining a second electrical quantity by removing the quantity of electric charge from a first electrical quantity that is input to each of the plurality of detection circuits; integrating the second electrical quantity to obtain an integrated value; and generating the fingerprint image based on comparison between the integrated value of the second electrical quantity and a predetermined threshold value.

Each of the plurality of detection circuits may include a current source, and a switch configured to connect the current source to the plurality of detection circuits according to a control signal. The determining the quantity of electric charge may include determining the quantity of electric charge based on an amount of a current generated from the current source included in each of the plurality of detection circuits and a turn-on time of the switch.

The predetermined threshold value may correspond to an input offset voltage of an amplifier included in each of the plurality of detection circuits.

The method may further include: determining the input offset voltage of the amplifier determined based on an output value of an analog-digital converter (ADC) included in each of the plurality of detection circuits.

The determining of the quantity of electric charge may include determining the quantity of electric charge such that a first component of the first electrical quantity is not less than the input offset voltage of the amplifier.

The method may further include: determining a maximum turn-on time of the switch during which a first component of the first electrical quantity is not less than an input offset voltage of an amplifier included in each of the plurality of detection circuits, by increasing the turn-on time of the switch while the amount of the current generated from the current source is fixed; and determining a maximum current amount of the current source at which the first component is not less than the input offset voltage of the amplifier, by adjusting the turn-on time of the switch and the amount of the current generated from the current source, wherein the obtaining the second electrical quantity may include obtaining the second electrical quantity by determining the quantity of electric charge based on the maximum turn-on time and the maximum current amount, and by removing the determined quantity of electric charge from the first electrical quantity.

The method may further include: determining a maximum current amount of the current source at which a first component of the first electrical quantity is not less than an input offset voltage of an amplifier included in each of the plurality of detection circuits, by increasing the amount of the current generated from the current source, when the turn-on time of the switch is fixed; and determining a maximum turn-on time of the switch during which the first component is not less than the input offset voltage, by adjusting the turn-on time of the switch and the amount of the current generated from the current source, wherein the obtaining the second electrical quantity may include obtaining the second electrical quantity by determining the quantity of electric charge based on the maximum current amount and the maximum turn-on time, and by removing the quantity of electric charge from the first electrical quantity.

The method may further include: based on the integrated value being greater than or equal to the predetermined threshold value, repeating at least once the determining the quantity of electric charge and the integrating the second electrical quantity.

The predetermined threshold value may represent a signal-to-noise ratio of each of the plurality of detection circuits.

According to an aspect of another example embodiment, there is provided a non-transitory computer-readable recording medium having recorded thereon a program for executing the method of generating the fingerprint image.

According to an aspect of another example embodiment, there is provided an apparatus including: a fingerprint sensor including a plurality of drive electrodes and a plurality of detection electrodes; a plurality of detection circuits connected to the fingerprint sensor; and at least one processor configured to: determine a quantity of electric charge to be removed from each of the plurality of detection circuits, based on an amplifier characteristic of each of the plurality of detection circuits; obtain a second electrical quantity by removing the quantity of electric charge from a first electrical quantity that is input to each of the plurality of detection circuits; integrate the second electrical quantity to obtain an integrated value; and generate a fingerprint image based on comparison between the integrated value of the second electrical quantity and a predetermined threshold value.

Each of the plurality of detection circuits may include a current source, and a switch configured to connect the current source to the plurality of detection circuits according to a control signal. The at least one processor may be further configured to determine the quantity of electric charge based on an amount of a current generated from the current source included in each of the detection circuits and an turn-on time of the switch.

Each of the plurality of detection circuits may include an amplifier. The predetermined threshold value may correspond to an input offset voltage of the amplifier included in each of the plurality of detection circuits.

The at least one processor may be further configured to determine the input offset voltage of the amplifier based on an output value of an analog-digital converter (ADC) included in each of the plurality of detection circuits.

The at least one processor may be further configured to determine the quantity of electric charge such that a first component of the first electrical quantity is not less than the input offset voltage of the amplifier.

The at least one processor may be further configured to: determine a maximum turn-on time during which a first component of the first electrical quantity is not less than an input offset voltage of an amplifier included in each of the plurality of detection circuits, by increasing the turn-on time of the switch while the amount of the current generated from the current source is fixed; determine a maximum current amount of the current source at which the first component is not less than the input offset voltage of the amplifier, by adjusting the turn-on time and the amount of the current generated from the current source, and obtain the second electrical quantity by determining the quantity of electric charge based on the maximum turn-on time and the maximum current amount and by removing the determined quantity of electric charge from the first electrical quantity.

The at least one processor may be further configured to: determine a maximum current amount of the current source at which a first component of the first electrical quantity is not less than an input offset voltage of an amplifier included in each of the plurality of detection circuits, by increasing the amount of the current generated from the current source, when the turn-on time of the switch is fixed; determine a maximum turn-on time of the switch during which the first component is not less than the input offset voltage, by adjusting the turn-on time of the switch and the amount of the current generated from the current source, and obtain the second electrical quantity by determining the quantity of electric charge based on the maximum current amount and the maximum turn-on time, and by removing the quantity of electric charge from the first electrical quantity.

The at least one processor may be further configured to, based on the integrated value being greater than or equal to the predetermined threshold value, repeat at least once an operation of determining the quantity of electric charge and an operation of integrating the second electrical quantity.

The predetermined threshold value may represent a signal-to-noise ratio of each of the plurality of detection circuits.

According to an aspect of another example embodiment, there is provided an electronic apparatus including: a fingerprint sensor comprising a plurality of drive electrodes and a plurality of detection electrodes; a plurality of detection circuits configured to receive a first electrical quantity from the plurality of detection electrodes of the fingerprint sensor, respectively, the plurality of detection circuits including an analog-digital converter (ADC), a current source, and a switch configured to connect the current source to the ADC; and at least one processor configured to: determine a candidate quantity of electric charge to be removed from each of the plurality of detection circuits, based on an output voltage of the ADC; integrate a second electrical quantity that is obtained by removing the candidate quantity of electric charge from the first electrical quantity, a first number of times until the first electrical quantity becomes less than a predetermined threshold value; and determine a final quantity of electric charge to be removed from each of the plurality of detection circuits, based on an integrated value of the second electrical quantity that is obtained by integrating the second electrical quantity a second number time that is one less than the first number of times; and generate a fingerprint image by removing the final quantity of electric charge from the plurality of detection circuits.

BRIEF DESCRIPTION OF THE DRAWINGS

The above and/or other aspects will be more apparent by describing certain example embodiments, with reference to the accompanying drawings, in which:

FIG. 8 illustrates in detail the method described in the flowchart of FIG. 7 according to an example embodiment;

DETAILED DESCRIPTION

The terms used in the present disclosure have been selected from currently widely used general terms in consideration of the functions in the present disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the present disclosure are defined based on their meanings in relation to the contents discussed throughout the specification, not by their simple meanings.

When a part may "include" a certain constituent element, unless specified otherwise, it may not be construed to exclude another constituent element but may be construed to further include other constituent elements. Furthermore, the terms such as "~ portion", "~ unit", and "~ module" stated in the specification may signify a unit to process at least one function or operation and the unit may be embodied by hardware, software, or a combination of hardware and software.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, the present disclosure will be described in detail by explaining preferred embodiments of the disclosure with reference to the attached drawings. However, the present disclosure is not limited thereto and it will be understood that various changes in form and details may be made therein.

In the following description, example embodiments are described in detail with reference to the drawings.

Figure 1:
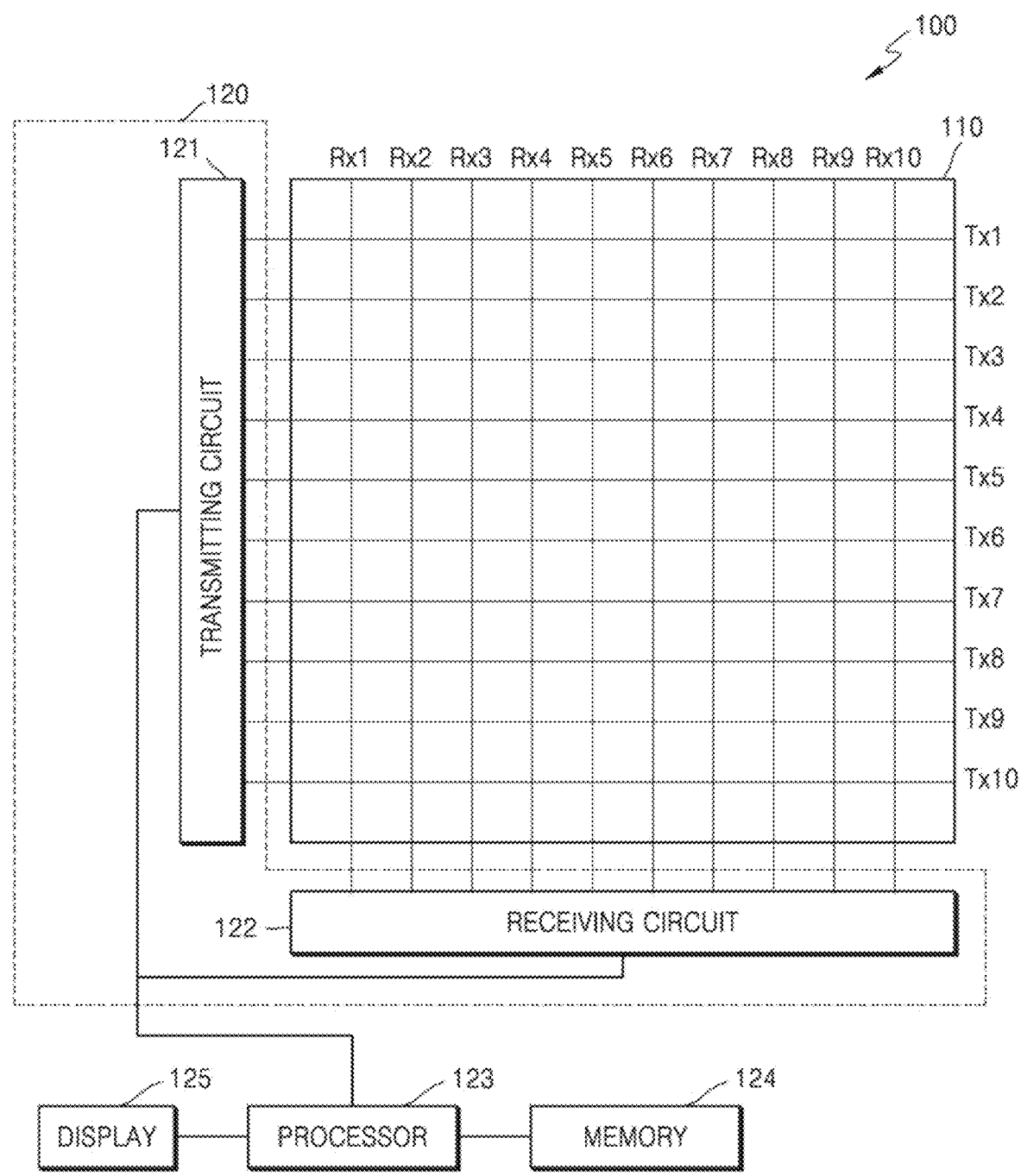
FIG. 1 illustrates an example of an apparatus for generating a fingerprint image according to an example embodiment.

FIG. 1 illustrates an example of an apparatus 100 for generating a fingerprint image according to an example embodiment. The apparatus 100 may be also referred to as a fingerprint reader or a fingerprint scanner.

Referring to FIG. 1, the apparatus 100 may include a sensor 110, an electronic circuit 120, a processor 123, a memory 124, and a display 125. Furthermore, the electronic circuit 120 may include a transmitting circuit 121 and a receiving circuit 122. Although FIG. 1 illustrates only constituent elements related to the apparatus 100, it will be understood by those of ordinary skill in the art that other general-purpose constituent elements may be further included.

The processor 123 may be embodied by an array of a plurality of logic gates, or a combination of a general-purpose microprocessor and a memory storing a program that is executable on the microprocessor. Furthermore, it will be understood by those of ordinary skill in the art that the processor 123 may be embodied in hardware of a different form.

The sensor 110 may include a plurality of drive electrodes Tx and a plurality of detection electrodes Rx arranged in a direction intersecting the drive electrodes Tx. Although FIG. 1 illustrates that the number of the drive electrodes Tx and the number of the detection electrodes Rx are ten, respectively, the disclosure is not limited thereto.

The transmitting circuit 121 may apply drive signals to the drive electrodes Tx, and the receiving circuit 122 may measure electrical signals from the detection electrodes Rx.

The drive electrodes Tx and the detection electrodes Rx of the sensor 110 may be arranged in directions intersecting each other. Although FIG. 1 exemplarily illustrates that the drive electrodes Tx and the detection electrodes Rx are arranged to be orthogonal to each other, the disclosure is not limited thereto. In other words, an angle between the direction in which the drive electrodes Tx are arranged and the direction in which the detection electrodes Rx are arranged may not be 90°.

When a user's finger approaches the sensor 110, mutual capacitance between each of the drive electrodes Tx and the detection electrodes Rx of the sensor 110 may vary. For example, the mutual capacitance at each node where the drive electrodes Tx and the detection electrodes Rx intersect each other in the sensor 110 may vary according to a fingerprint pattern of a user. As the interval between the drive electrodes Tx and the interval between the detection electrodes Rx decrease, the resolution of a fingerprint sensor may increase. A passivation layer for protecting the drive electrodes Tx and the detection electrodes Rx may be further included in the sensor 110.

For example, the drive electrodes Tx and the detection electrodes Rx may include line electrodes. Furthermore, each of the drive electrodes Tx may further include certain patterns provided between nodes where the drive electrodes Tx and the detection electrodes Rx intersect each other. The above-described pattern may have various shapes such as a polygon or a circle. Likewise, each of the detection electrodes Rx may further include certain patterns provided between the above-described nodes.

The transmitting circuit 121 may apply drive signals to the drive electrodes Tx. For example, the transmitting circuit 121 may apply a voltage pulse to each of the drive electrodes Tx. The receiving circuit 122 may measure electrical signals from the detection electrodes Rx. As an example, the receiving circuit 122 may measure a current flowing in each of the detection electrodes Rx. As another example, the receiving circuit 122 may measure an electric potential of each of the detection electrodes Rx.

The processor 123 generally control the operations of the transmitting circuit 121 and the receiving circuit 122 included in the apparatus 100. For example, the processor 123 may control the amplitude and application duration of the voltage pulse applied by the transmitting circuit 121 to each of the drive electrodes Tx. Furthermore, the processor 123 may control the transmitting circuit 121 such that a voltage pulse may be selectively applied to some of the drive electrodes Tx.

The processor 123 may generate and process data related to a fingerprint using the current or electric potential received by the receiving circuit 122. For example, the processor 123 may generate data corresponding to a fingerprint image using the current or electric potential received by the receiving circuit 122, and generate a fingerprint image using pixel values included in the data.

Figure 2:
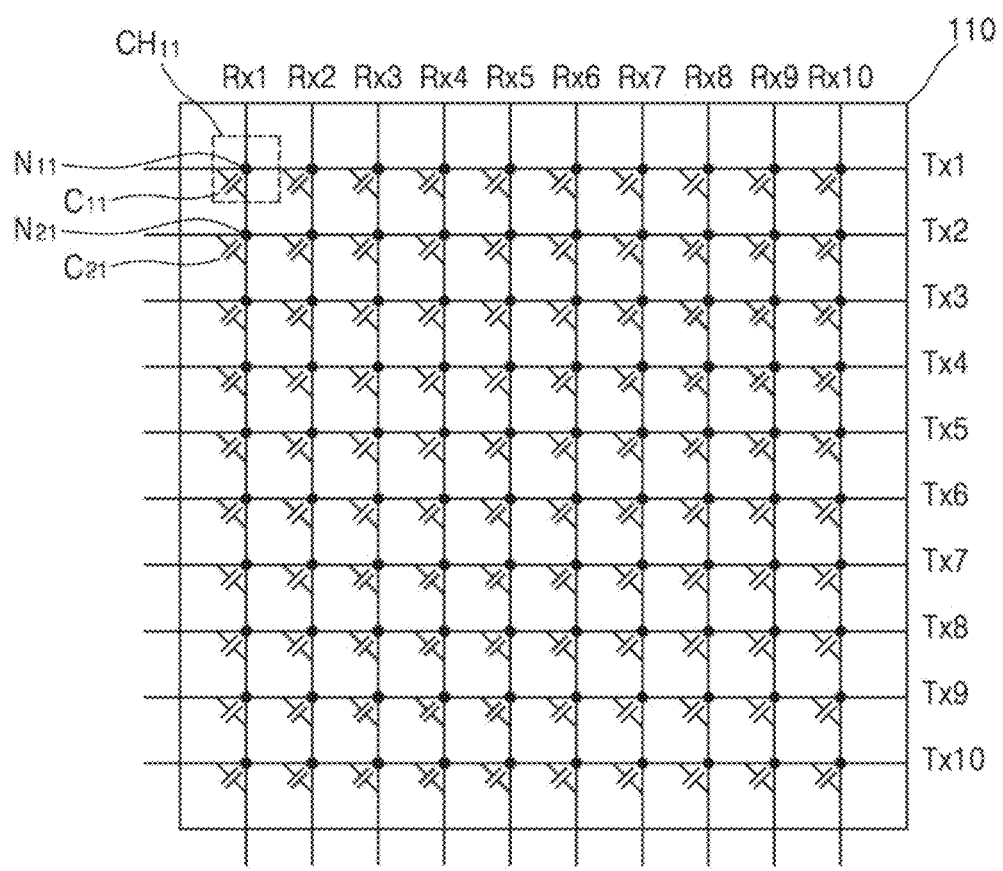
FIG. 2 illustrates a concept of a mutual capacitance corresponding to each of nodes of a sensor according to an example embodiment.

FIG. 2 illustrates a concept of a mutual capacitance corresponding to each of nodes of the sensor 110 according to an example embodiment.

Referring to FIG. 2, the mutual capacitance between the drive electrodes Tx and the detection electrodes Rx may correspond to the nodes where the drive electrodes Tx and the detection electrodes Rx intersect each other.

For example, mutual capacitance C11 between a first drive electrode Tx1 and a first detection electrode Rx1 may be detected from a node N11 where the first drive electrode Tx1 and the first detection electrode Rx1 intersect each other. Likewise, mutual capacitance Cmn between an m-th drive electrode Txm and an n-th detection electrode Rxn may be detected from a node Nmn where the m-th drive electrode Txm and the n-th detection electrode Rxn intersect each other. Here, "m" and "n" denote natural numbers. In the following description, the mutual capacitance at the node Nmn means a mutual capacitance between the m-th drive electrode Txm and the n-th detection electrode Rxn.

A plurality of channels of the sensor 110 may be defined by the drive electrodes Tx and the detection electrodes Rx. For example, the plurality of channels may respectively correspond to a plurality of nodes formed at the intersections of the drive electrodes Tx and the detection electrodes Rx. For example, a channel CH11 may correspond to the node N11.

For example, to measure the mutual capacitance at each of a plurality of nodes, the transmitting circuit 121 may sequentially apply different drive signals to the respective drive electrodes Tx. Furthermore, the receiving circuit 122 may measure an individual electrical signal from each of the detection electrodes Rx. For example, when the mutual capacitance C11 is to be measured, a drive signal may be applied to the first drive electrode Tx1, and the electrical signal from the first detection electrode Rx1 may be measured. Likewise, when the mutual capacitance Cmn is to be measured, a drive signal may be applied to the m-th drive electrode Txm, and the electrical signal from the n-th detection electrode Rxn may be measured.

The receiving circuit 122 may include detection circuits respectively connected to the detection electrodes Rx. An example detection circuit is described below with reference to FIG. 3.

Figure 3:
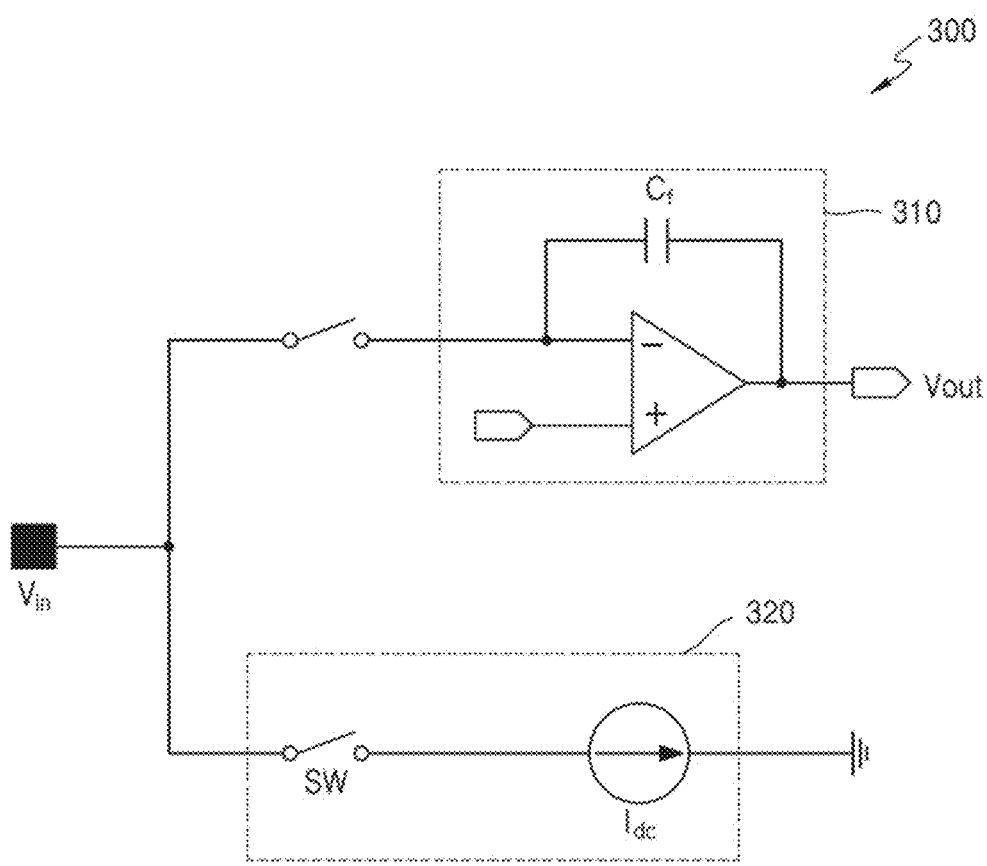
FIG. 3 illustrates an example of a detection circuit included in a receiving circuit according to an example embodiment.

FIG. 3 illustrates an example of a detection circuit 300 included in the receiving circuit 122 according to an example embodiment.

Referring to FIG. 3, the detection circuit 300 may include a first part 310 and a second part 320. Although only constituent elements related to the detection circuit 300 of FIG. 3 are illustrated, it will be understood by those of ordinary skill in the art that other general-purpose constituent elements may be further included.

The first part 310 may process an input electrical signal received from one of the detection electrodes Rx, and may include at least one amplifier AMP and a feedback capacitor Cf. The at least one amplifier AMP may be implemented as an operational amplifier. The input electrical signal received from the detection electrode Rx may be expressed as an electrical quantity indicating an object detected by the sensor 110. In this case, the electrical quantity may be used to describe a certain electrical property, parameter, or attribute that may be quantified by a certain measurement. For example, the electrical quantity may include an electric charge, a current, a voltage, an impedance, a capacitance (mutual capacitance), or a resistance. When an object detected by the sensor 110 is assumed to be a fingerprint, an electrical quantity output from the detection electrode Rx may be expressed as a voltage difference between a voltage corresponding to a ridge of a fingerprint and a voltage corresponding to a valley of the fingerprint, or a capacitance difference between the ridge and the valley, that is, a capacitance difference $\Delta$Cm between the mutual capacitance corresponding to the ridge and the mutual capacitance corresponding to the valley.

The second part 320 may generate a quantity of electric charge to be removed from the electrical quantity to be input to the first part 310, and may include a current source Idc and a switch SW. The electric charge Q is generated by current I supplied from the current source Id and a switch connection time (or a switch turned-on time) t during which the switch SW is turned on. The quantity of electric charge Q may be equal to a multiplication of the current I and the switch connection time (i.e., Q=I×t). The charge provided from the detection circuit 300 may be reduced as much as the quantity of charge generated by the second part 320. In other words, the quantity of electric charge generated by the second part 320 is removed from the electrical quantity input to the first part 310, and a result of the removal is output to an output terminal Vout via the first part 310. Accordingly, as a closed time of the switch SW extends, the quantity of electric charge generated from the second part 320 may increase and the total quantity of charge generated from the detection circuit 300 may decrease. Furthermore, as the amount of the current generated by the current source Idc increases, the electrical quantity removed from the electrical quantity generated by the first part 310 increases.

An input terminal Vin of the detection circuit 300 may be connected to any one of the detection electrodes Rx included in the sensor 110. In other words, assuming that the sensor 110 includes n-number of the detection electrodes Rx, the receiving circuit 122 may include n-number of the detection circuits 300.

As described above with reference to FIG. 1, the passivation layer may be deposited on the sensor 110. In general, in a system adopting a capacitive sensor, as the thickness of a sensor increases, it may be more difficult to obtain a quality image. When a capacitive sensor system detects a user's fingerprint, the mutual capacitance $\Delta$Cm corresponding to a capacitance difference between the ridge and the valley of a fingerprint is inversely proportional to the square of the thickness of the passivation. Accordingly, when the thickness of the passivation is greater than or equal to a certain condition, it may be difficult to detect the mutual capacitance $\Delta$Cm corresponding to the capacitance difference between the ridge and the valley of a fingerprint.

The quality of a fingerprint image may be proportional to the amount of the mutual capacitance $\Delta$Cm corresponding to the capacitance difference between the ridge and the valley of a fingerprint. Accordingly, as the amount of the mutual capacitance $\Delta$Cm corresponding to the capacitance difference between the ridge and the valley of a fingerprint decreases, the quality of a fingerprint image is lowered.

Accordingly, in general, the system adopting a capacitive sensor accumulates the mutual capacitance $\Delta$Cm corresponding to the capacitance difference between the ridge and the valley of a fingerprint by integrating several to several hundred times a signal input to the input terminal Vin of FIG. 3, that is, a signal from the detection electrode Rx.

As a maximum voltage Vdd to be usable by the first part 310 exists, the available number of the above-described integrals may be limited. In other words, the above-described integral may be repeatedly performed until an output Vout according to the quantity of electric charge obtained through the integral becomes greater than or equal to the maximum voltage Vdd to be usable by the first part 310, or until the quantity of electric charge obtained through the integral becomes equal to the capacity of the feedback capacity Cf of the first part 310. In general, as the number of integrals increase, a signal-to-noise ratio of a signal output from the output terminal Vout is improved. However, as described above, as the number of integrals is limited due to the maximum voltage Vdd, unnecessary quantity of electric charge may be removed as much as possible from the quantity of electric charge or the mutual capacitance $\Delta$Cm obtained through the integral.

The detection circuit 300 according to an example embodiment may include the second part 320, and when the switch SW of the second part 320 is closed, electric charges from the current source Idc to the first part 310 are removed so that the electric charges input to the first part 310 are reduced. Accordingly, even when the integrals are repeatedly performed by the first part 310, the quantity of electric charge obtained through the integral may not exceed an integral limit value. Accordingly, the number of integrals to be performed increases, which leads to the improvement of the quality of a fingerprint image. In the following description, for convenience of explanation, a decrease in the electric charges input to the first part 310 is expressed to be a removal of the electric charges input to the first part 310.

In particular, the second part 320 of the detection circuit 300 is individually connected to the first part 310. In other words, while a single second part is not connected to a plurality of first parts, each second part 320 is connected to each first part 310. Accordingly, even when the specifications and/or parameters of the detection circuits 300 connected to the sensor 110 are different from each other, an optimal quantity of electric charge may be removed for each of the detection circuits 300.

An example of generating an image of an object detected by the sensor 110 as the apparatus 100 removes an optimal quantity of electric charge for each detection circuit 300 and integrating the quantity of electric charge where unnecessary electric charges are removed is described with reference to FIGS. 4 to 10.

Figure 4:
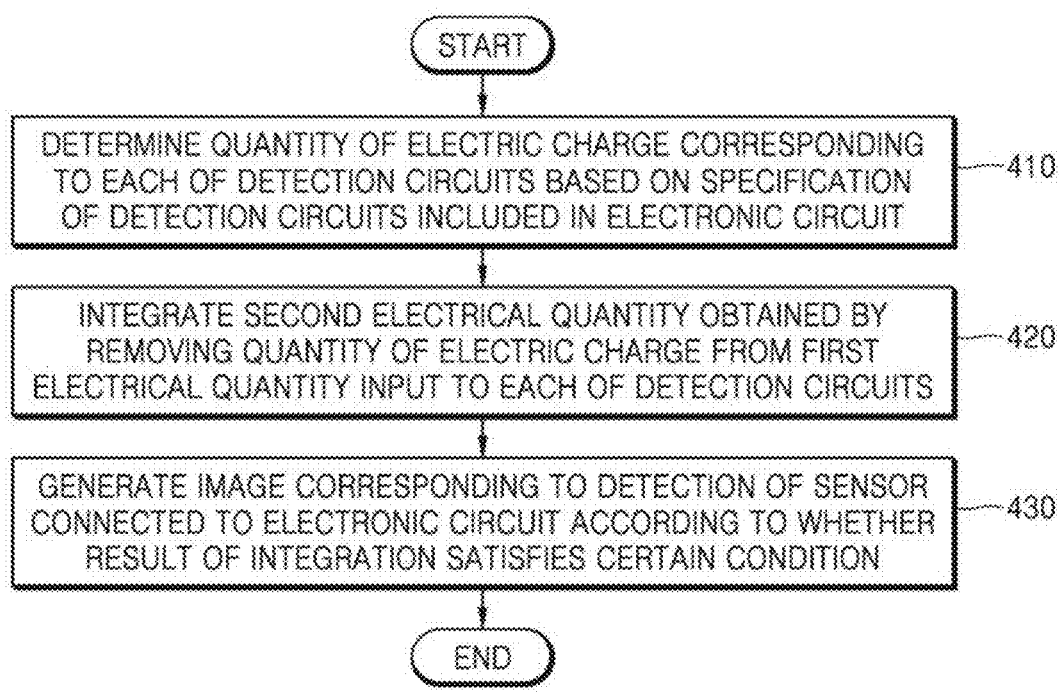
FIG. 4 is a flowchart of an example of a method of generating a fingerprint image according to an example embodiment.

FIG. 4 is a flowchart of an example of a method of generating a fingerprint image according to an example embodiment.

Referring to FIG. 4, a method of generating a fingerprint image may include operations that are time-serially processed by the apparatus 10, the sensor 110, and the electronic circuit 120 illustrated in FIGS. 1 to 3. Accordingly, it may be seen that the descriptions presented above regarding the apparatus 10, the sensor 110, and the electronic circuit 120 illustrated in FIGS. 1 to 3, even though the descriptions are omitted below, are applied to the image generating method of FIG. 4.

In operation 410, the processor 123 may determine a quantity of electric charge detected by each of the detection circuits 300 based on the specifications and/or parameters of the detection circuits 300 included in the electronic circuit 120. For example, the specifications and parameters of the detection circuits 300 may include a phase margin, a gain margin, a differential voltage gain, an input capacitance, and an input offset voltage of an amplifier of each of the detection circuits 300, but are not limited thereto.

For example, the processor 123 may determine a quantity of electric charge based on an offset of the detection circuit 300 (e.g., an input offset voltage of the amplifier of the detection circuit 300). The offset may be determined by an output value of an analog-digital converter (ADC) at the rear end of the detection circuit 300. For example, the processor 123 may determine a quantity of electric charge such that a first component of a first electrical quantity input to the detection circuit 300 is not less than the offset of the detection circuit 300. For example, assuming that the sensor 110 is a sensor for detecting a fingerprint, the first component may be a voltage corresponding to the ridge of a fingerprint, but the disclosure is not limited thereto.

The processor 123 adjusts the amount of the current generated in the current source Idc included in the detection circuit 300 and an operation time of the switch SW connected to the current source Idc, so as to correspond to the determined quantity of electric charge. For example, the processor 123 calculates a quantity of electric charge by adjusting the amount of the current generated in the current source Idc and the operation time of the switch SW. For example, an electric charge quantity Q may be determined by a multiplication of the current amount I and a time T during which the current flows. Accordingly, the processor 123 may calculate the quantity of electric charge based on the amount of the current generated in the current source Idc and the operation time of the switch SW.

The operation time of the switch SW means a time during which the switch SW is closed and becomes a conductive state. For example, referring to the detection circuit 300 of FIG. 3, a current to be removed from the first part 310 is determined based on the time during which the switch SW is closed.

An example in which the processor 123 determines the quantity of electric charge corresponding to the detection circuit 300 and the amount of the current of the current source Idc and the operation time of the switch SW are adjusted to correspond to the determined quantity of electric charge is described below with reference to FIGS. 5 to 9.

In operation 420, the processor 123 integrates a second electrical quantity obtained by removing the quantity of electric charge determined in operation 410 from the first electrical quantity input to each of the detection circuits 300.

For example, when the sensor 110 is a sensor for detecting a fingerprint, the first electrical quantity may be an a difference between a voltage corresponding to a ridge of a fingerprint and a voltage corresponding to a valley of the fingerprint, or a capacitance difference between the ridge and the valley, that is, a difference $\Delta Cm$ between the mutual capacitance corresponding to the ridge and the mutual capacitance corresponding to the valley.

The processor 123 removes the quantity of electric charge determined in operation 410 from the first electrical quantity. The processor 123 integrates a second electrical quantity obtained by removing some quantity of electric charge from the first electrical quantity. Accordingly, the amount of the mutual capacitance $\Delta Cm$ corresponding to the difference between the ridge and the valley of a fingerprint may increase.

As described above with reference to FIG. 3, as a limit value of integral exits, the available number of the above-described integrals may be restricted. However, as the processor 123 integrates the second electrical quantity, the available number of integrals increases. Accordingly, the quality of the image generated by the processor 123 is improved, as least because the mutual capacitance at each node of the sensor 110 is removed by an amount adjusted for each of the detection circuits 300 according to the specification/parameter (e.g., an input offset voltage of an amplifier of each of the detection circuits 300).

In operation 430, the processor 123 generates an image corresponding to the detection of the sensor 110 connected to the electronic circuit 120 according to whether a result of the integral of operation 420 satisfies a certain condition.

For example, the processor 123 may generate the image corresponding to the detection of the sensor 110 only when the result of the integral of operation 420 satisfies a certain condition. The certain condition may be a certain signal-to-noise ratio, for example, 10 dB or more. However, the certain condition is not limited to the above description.

When the result of the integral of operation 420 does not satisfy the certain condition, the processor 123 may repeat operation 410 and operation 420 at least once. For example, when the result of the integral does not satisfy a certain signal-to-noise ratio, the processor 123 determines again the quantity of electric charge based on a third electrical quantity obtained by integrating the second electrical quantity. In other words, the processor 123 determines again the quantity of electric charge such that a first component of the third electrical quantity is not less than the offset of the detection circuit 300.

The processor 123 readjusts the amount of the current generated in the current source Idc included in the detection circuit 300 and the operation time of the switch SW connected to the current source Idc, to correspond to the redetermined quantity of electric charge.

The processor 123 reintegrates a fourth electrical quantity obtained by removing the redetermined quantity of electric charge from the third electrical quantity. The processor 123 generates the image corresponding to the detection of the sensor 110 only when the reintegrated result satisfies a certain condition. When the reintegrated result does not satisfy the certain condition, the above-described processes of determining the quantity of electric charge, removing the quantity of electric charge, and integrating the electrical quantity are repeated.

The processor 123 may generate a high quality image representing an object detected by the sensor 110 through the above-described processes.

Figure 5:
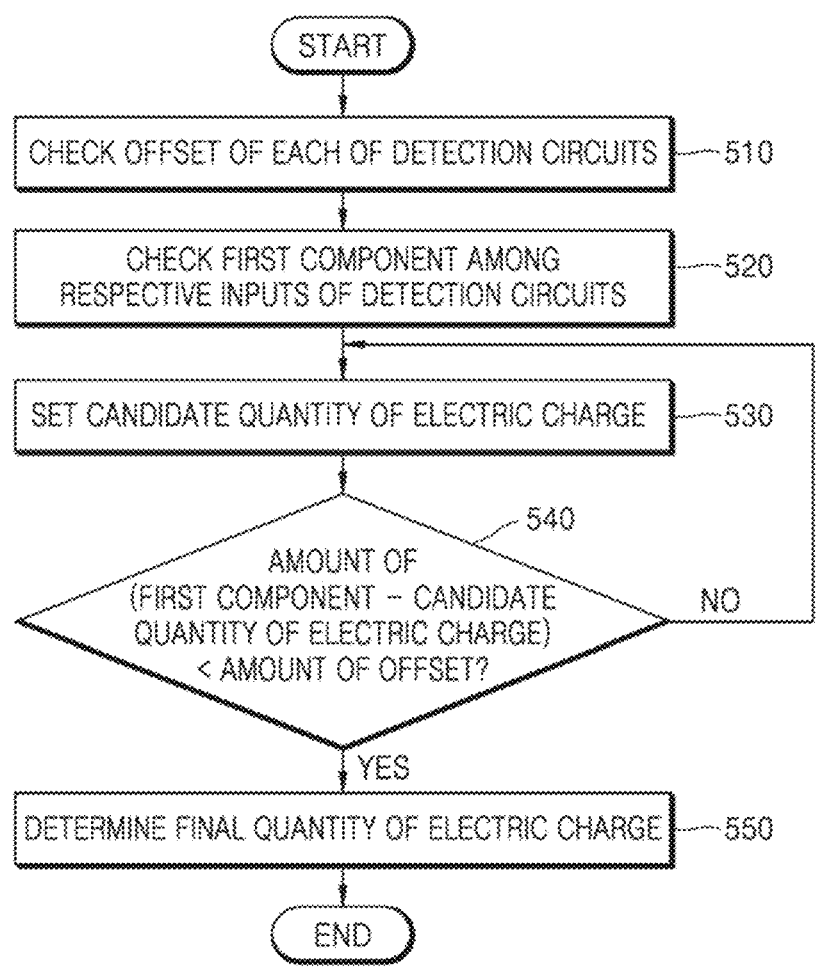
FIG. 5 is a flowchart of an example of determining, by a processor, a quantity of electric charge according to an example embodiment.

FIG. 5 is a flowchart of an example of determining, by a processor, a quantity of electric charge according to an example embodiment.

In operation 510, the processor 123 checks an offset of each of the detection circuits 300. For example, the processor 123 may determine, to be an offset, an output value of the ADC included in the detection circuit 300 when the integral of electrical quantity is not performed.

In operation 520, the processor 123 checks a first component among the respective inputs of the detection circuits 300. For example, the processor 123 may check a first component from the electrical quantity input to the detection circuit 300. When the sensor 110 is a sensor for detecting a fingerprint, the first component may be a voltage corresponding to the ridge of a fingerprint, the disclosure is not limited thereto.

In operation 530, the processor 123 sets a candidate quantity of electric charge. For example, the processor 123 may set the candidate quantity of electric charge by adjusting parameters of parameters of the current source Idc and the switch SW of the second part 320 of the detection circuit 300. In detail, the processor 123 may set the candidate quantity of electric charge by increasing, by a certain amount, the current amount of the current source Idc and the operation time of the switch SW.

In operation 540, the processor 123 determines whether the amount of the first component from which the candidate quantity of electric charge is removed is less than the amount of the offset. For example, when the first component is a voltage corresponding to the ridge of a fingerprint, the processor 123 determines whether the amount of the voltage corresponding to the ridge of a fingerprint from which the candidate quantity of electric charge is removed is less than the amount of the offset. When the amount of the first component from which the candidate quantity of electric charge is removed is less than the amount of the offset, the process proceeds to operation 550; otherwise, the process goes to operation 530, thereby resetting the candidate quantity of electric charge.

In operation 550, the processor 123 determines a final quantity of electric charge. The processor 123 may determine the final quantity of electric charge such that the amount of the first component from which the quantity of electric charge is removed is not less than the offset. For example, the processor 123 may determine a candidate quantity of electric charge before the amount of the first component from which the candidate quantity of electric charge is removed is less than the offset, to be the final quantity of electric charge.

While the processor 123 repeatedly performs operations 530 and 540 until the amount of the first component from which the quantity of electric charge is removed is not less than the offset, the processor 123 may store each of the candidate quantities of electric charge in the memory 124 and assign a reference number to each of the candidate quantities of electric charge in the order in which the candidate quantities of electrical charge are applied in operation 530. The reference number may indicate the number of times that each of operations 530 and 540 is performed. When the processor 123 determines that the condition of operation 540 is satisfied at the $n^{th}$ operation of operation 540, the processor 123 may retrieve the candidate quantity of electric charge that is set at the $n-1^{th}$ operation of operation 530, based on the reference number $n-1^{th}$ associated with the $n-1^{th}$ operation of operation 530. For example, the processor 127 may control the memory 124 to store the following data:

| Reference No. | Candidate quantity of electric charge set in operation 530 | Whether condition of operation 540 is satisfied |
| --- | --- | --- |
| 1 | 5 | No. |
| 2 | 10 | No. |
| 3 | 20 | No. |
| 4 | 30 | No. |
| 5 | 40 | Yes. |

An example in which the processor 123 determines a final quantity of electric charge is described below in detail with reference to FIG. 6.

Figure 6:
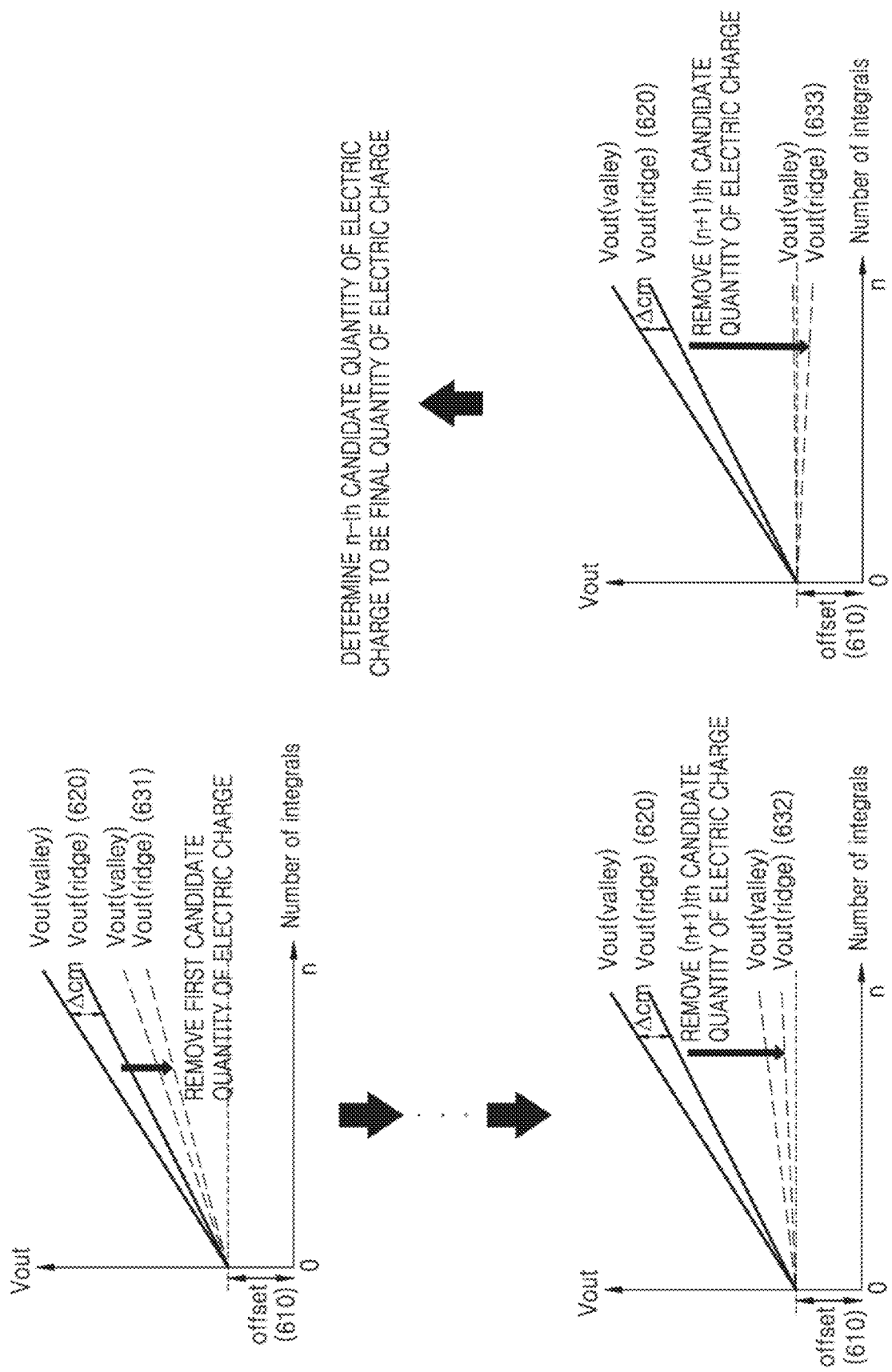
FIG. 6 illustrates an example of determining, by a processor, a final quantity of electric charge according to an example embodiment.

FIG. 6 illustrates an example of determining, by a processor, a final quantity of electric charge according to an example embodiment.

First, the processor 123 determines the output value of the ADC of the detection circuit 300 to be an offset 610. Then, the processor 123 checks a first component 620 from the electrical quantity input to the detection circuit 300.

The processor 123 sets the candidate quantity of electric charge by adjusting the current amount of the current source Idc of the detection circuit 300 and the operation time of the switch SW. For example, the processor 123 may increase the amount of the candidate quantity of electric charge by increasing the current amount and the operation time by a certain amount.

The processor 123 checks whether the results 631, 632, and 633 obtained by removing the candidate quantity of electric charge from the first component 620 is less than the offset 610. The processor 123 performs the process of setting the candidate quantity of electric charge, m times, where m is a natural number, and checks whether the results 631, 632, and 633 obtained by removing the candidate quantity of electric charge from the first component 620 is less than the offset 610.

For example, when the result 631 of removing a first candidate quantity of electric charge from the first component 620 is greater than the offset 610, the processor 123 sets a second candidate quantity of electric charge and repeats the above-described process. In such a manner, when the result 633 of removing the (n+1)th, where n is a natural number, candidate quantity of electric charge from the first component 620 is, for the first time, less than the offset 610, the processor 123 determines the n-th candidate quantity of electric charge to be the final quantity of electric charge. In other words, when the result 632 of removing the n-th candidate quantity of electric charge from the first component 620 most closely exceeds the offset 610, the processor 123 determines the n-th candidate quantity of electric charge to be the final quantity of electric charge.

The candidate quantity of electric charge may be set as the current amount of the current source Idc of the detection circuit 300 and the operation time of the switch SW are adjusted. For example, the processor 123 may set the candidate quantity of electric charge by performing a two-step adjustment process.

As an example, the processor 123 may perform a first step adjustment process to determine the maximum operation time of the switch SW by increasing the operation time of the switch SW when the current amount of the current source Idc is fixed. The processor 123 may perform the second step adjustment process to determine the maximum current amount of the current source Idc by adjusting the current amount of the current source Idc and the operation time of the switch SW altogether.

As another example, the processor 123 may perform the first step adjustment process to determine the maximum current amount of the current source Idc by increasing the current amount of the current source Idc when the operation time of the switch SW is fixed. The processor 123 may perform the second step adjustment process to determine the maximum operation time of the switch SW by adjusting the current amount of the current source Idc and the operation time of the switch SW altogether.

An example in which a processor sets the candidate quantity of electric charge by performing the two-step adjustment processes is described below in detail with reference to FIGS. 7, 8, and 9.

Figure 7:
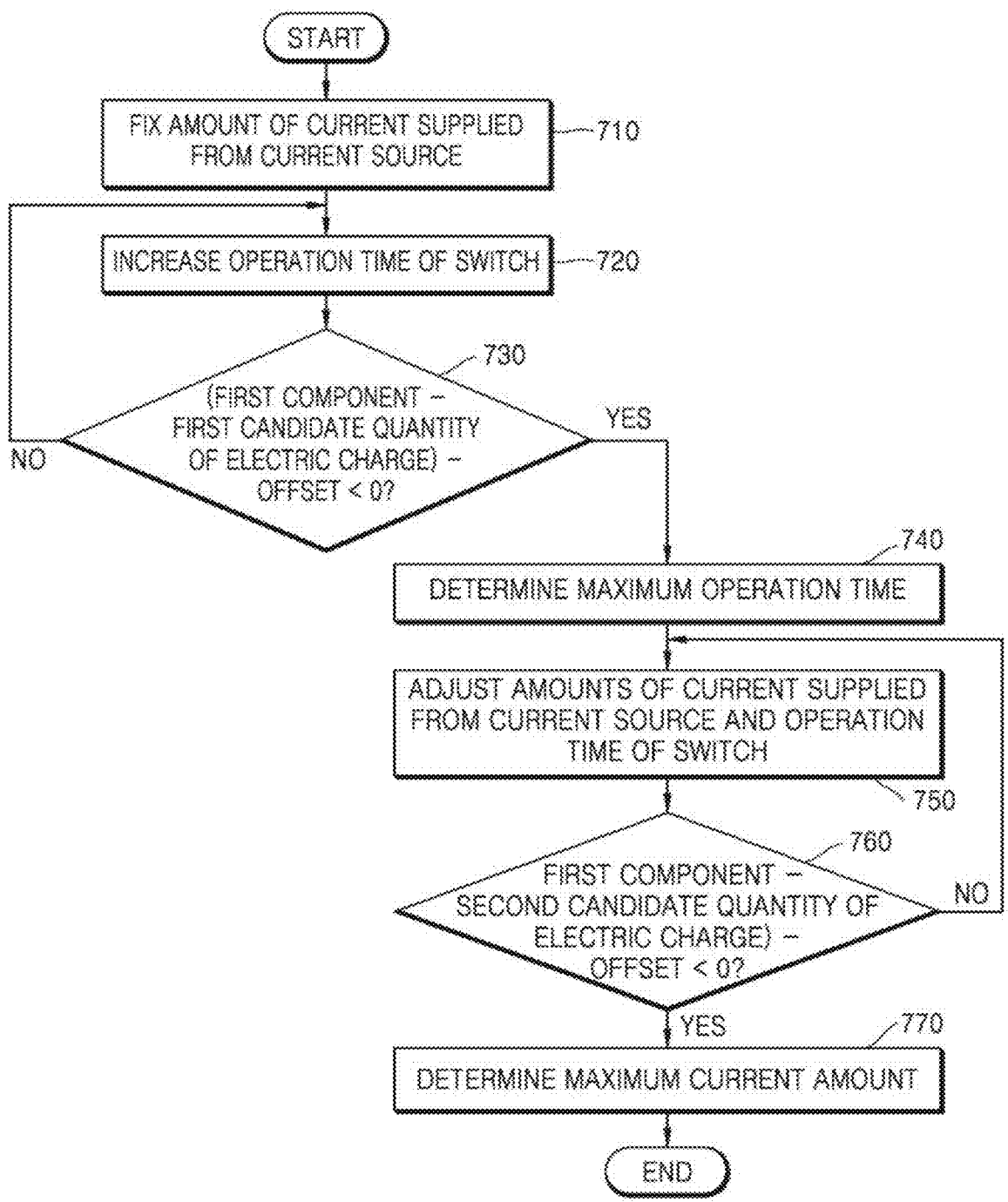
FIG. 7 is a flowchart of an example of setting, by a processor, a candidate quantity of electric charge according to an example embodiment.

FIG. 7 is a flowchart of an example of setting, by a processor 1123, a candidate quantity of electric charge according to an example embodiment.

Referring to FIG. 7, the first step adjustment process may include operations 710 to 740. Furthermore, the second step adjustment process may include operations 750 to 770.

In operation 710, the processor 123 fixes the amount of a current supplied from the current source Idc to a specific value. For example, the specific value may be a default value of the apparatus 100, and may be adaptively changed according to the object detected by the sensor 110 or the number of integrals. Furthermore, the specific value may be changed by a user.

In operation 720, the processor 123 increases the operation time of the switch SW. In other words, the processor 123 increases the time during which the switch SW is closed and becomes a conductive state.

In operation 730, the processor 123 determines whether the amount of the first component from which the first candidate quantity of electric charge is removed is less than the amount of the offset. For example, the processor 123 may calculate the first candidate quantity of electric charge by multiplying the amount of the current supplied from the current source Idc and the operation time of the switch SW. When the amount of the first component from which the first candidate quantity of electric charge is removed is greater than the amount of the offset, the process goes to operation 720; otherwise, the process goes to operation 740.

In operation 740, the processor 123 determines the maximum operation time of the switch SW. For example, the processor 123 selects the candidate quantity of electric charge before the amount of the first component from which the first candidate quantity of electric charge is removed is, for the first time, less than the offset. The processor 123 determines the operation time used for calculating the selected candidate quantity of electric charge to be the maximum operation time. The process of selecting, by the processor 123, the candidate quantity of electric charge is described above with reference to FIGS. 5 and 6.

In summary, in operation 710, the amount of the current supplied from the current source Idc is determined, and in operation 740, the operation time of the switch SW is determined. However, the amount of the current and the operation time which are determined as operations 710 to 740 are performed may not be optimal results. This is because, in operation 710, it is assumed that the amount of the current is fixed to a specific value. Accordingly, the processor 123 may determine an optimal amount of the current and an optimal operation time by performing a coarse adjustment through the first step adjustment process and a fine adjustment through the second step adjustment process.

In operation 750, the processor 123 adjusts the operation time of the switch SW and the amount of the current supplied from the current source Idc. In operation 760, the processor 123 determines whether the amount of the first component from which the second candidate quantity of electric charge is removed is less than the amount of the offset. For example, the processor 123 may calculate the second candidate quantity of electric charge by multiplying the amount of a current and the operation time which are adjusted in operation 750. When the amount of the first component from which the first candidate quantity of electric charge is removed is greater than the amount of the offset, the process goes to operation 750; otherwise, the process goes to operation 770.

In operation 770, the processor 123 determines the maximum current amount of the current source Idc. For example, the processor 123 selects the candidate quantity of electric charge before the amount of the first component from which the second candidate quantity of electric charge is removed is, for the first time, less than the offset. The processor 123 determines the current amount used to calculate the selected candidate quantity of electric charge to be the maximum current amount. The process of selecting, by the processor 123, the candidate quantity of electric charge is described above with reference to FIGS. 5 and 6.

FIG. 8 illustrates in detail the method described in the flowchart of FIG. 7 according to an example embodiment.

FIG. 8 illustrates an example of a table consisting of the current amount I of the current source Idc, the operation time T of the switch SW, and, the electric charge quantity Q. The electric charge quantity Q is calculated by multiplying the current amount I and the operation time T.

It is assume that the operation time T may be changed by one from 1 to 20 and that the current amount I may be changed by one from 1 to 20. Furthermore, a range from 1 to 20 is assumed to indicate a relative amount from the minimum value to the maximum value of each of the operation time T and the current amount I. In this case, the total number of combinations of [the operation time T, the current amount I] to be selected by the processor 123 is 400. Accordingly, a lot of calculations may be necessary to determine the optimal operation time T and the optimal current amount I. As the processor 123 performs the first step adjustment and the second step adjustment, the amount of calculations needed for determining the optimal operation time T and the optimal current amount I may be reduced.

The processor 123 may perform the first step adjustment by increasing one of the current amount I and the operation time T while fixing the other to a specific value. For example, the processor 123 may perform the first step adjustment in which the amount of the operation time T is increased while the current amount I is fixed to 14. For example, FIG. 8 illustrates that the maximum operation time T is determined to be 12 according to the first step adjustment.

In FIG. 8, as the current amount I is assumed to be fixed to 14 in the first step adjustment, the electric charge quantity Q of 6.72 C, which is a result of the first step adjustment, may not be an optimal quantity of electric charge. In other words, the optimal electric charge quantity Q may be any value in a range of 6.72 C to 7.28 C, and thus the optimal electric charge quantity Q may not be fixed to 6.72 C.

The processor 123 may perform the second step adjustment by adjusting the current amount I and the operation time T. In FIG. 8, as the second step adjustment is performed, it may be checked that the optimal electric charge quantity Q is 7.2 C, and thus the maximum operation time T may be determined to be 12 and the maximum current amount I may be determined to be 15.

According to the above description with reference to FIGS. 7 and 8, the processor 123 may perform the first step adjustment while fixing the current amount I supplied from the current source Idc, but the disclosure is not limited thereto.

An example of performing, by the processor 123, the first step adjustment while fixing the operation time T of the switch SW is described below with reference to FIG. 9.

Figure 9:
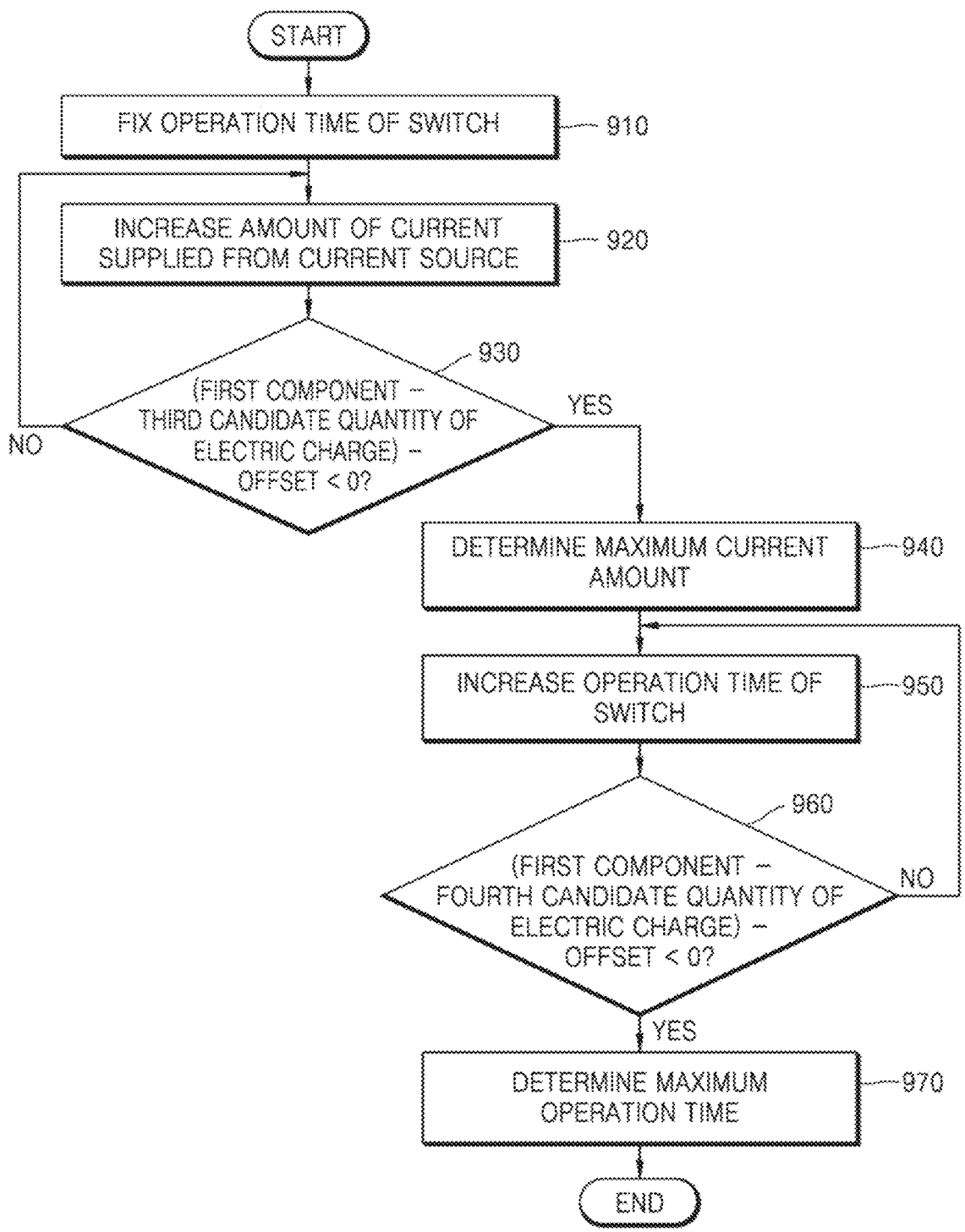
FIG. 9 is a flowchart of another example of setting, by a processor, a candidate quantity of electric charge according to an example embodiment.

FIG. 9 is a flowchart of another example of setting, by a processor, a candidate quantity of electric charge according to an example embodiment.

Referring to FIG. 9, the first step adjustment process may include operations 910 to 940. Furthermore, the second step adjustment process may include operations 950 to 970.

In operation 910, the processor 123 fixes the operation time of the switch SW to a specific value. For example, the specific value may be a default value of the apparatus 100, or may be adaptively changed according to the object detected by the sensor 110 or the number of integrals. Furthermore, the specific value may be changed by a user.

In operation 920, the processor 123 increases the current amount of the current source Idc. In operation 930, the processor 123 determines whether the amount of the first component from which the third candidate quantity of electric charge is removed is less than the amount of the offset. When the amount of the first component from which the third candidate quantity of electric charge is removed is greater than the amount of the offset, the process goes to operation 920; otherwise, the process goes to operation 940.

In operation 940, the processor 123 determines the maximum current amount of the current source Idc. For example, the processor 123 selects the candidate quantity of electric charge before the amount of the first component from which the first candidate quantity of electric charge is removed is, for the first time, less than the offset. The processor 123 determines the current amount used to calculate the selected candidate quantity of electric charge to be the maximum current amount. The process of selecting, by the processor 123, the candidate quantity of electric charge is described above with reference to FIGS. 5 and 6.

In operation 950, the processor 123 adjusts the operation time of the switch SW and the amount of the current supplied from the current source Idc. In operation 960, the processor 123 determines whether the amount of the first component from which the fourth candidate quantity of electric charge is removed is less than the amount of the offset. When the amount of the first component from which the fourth candidate quantity of electric charge is removed is greater than the amount of the offset, the process goes to operation 950; otherwise, the process goes to operation 970.

In operation 970, the processor 123 determines the maximum operation time of the switch SW. For example, the processor 123 selects a candidate quantity of electric charge before the amount of the first component from which the second candidate quantity of electric charge is removed is, for the first time, less than the offset. The processor 123 determines the operation time used to calculate the selected candidate quantity of electric charge to be the maximum operation time. The process of selecting, by the processor 123, the candidate quantity of electric charge is described above with reference to FIGS. 5 and 6.

Figure 10:
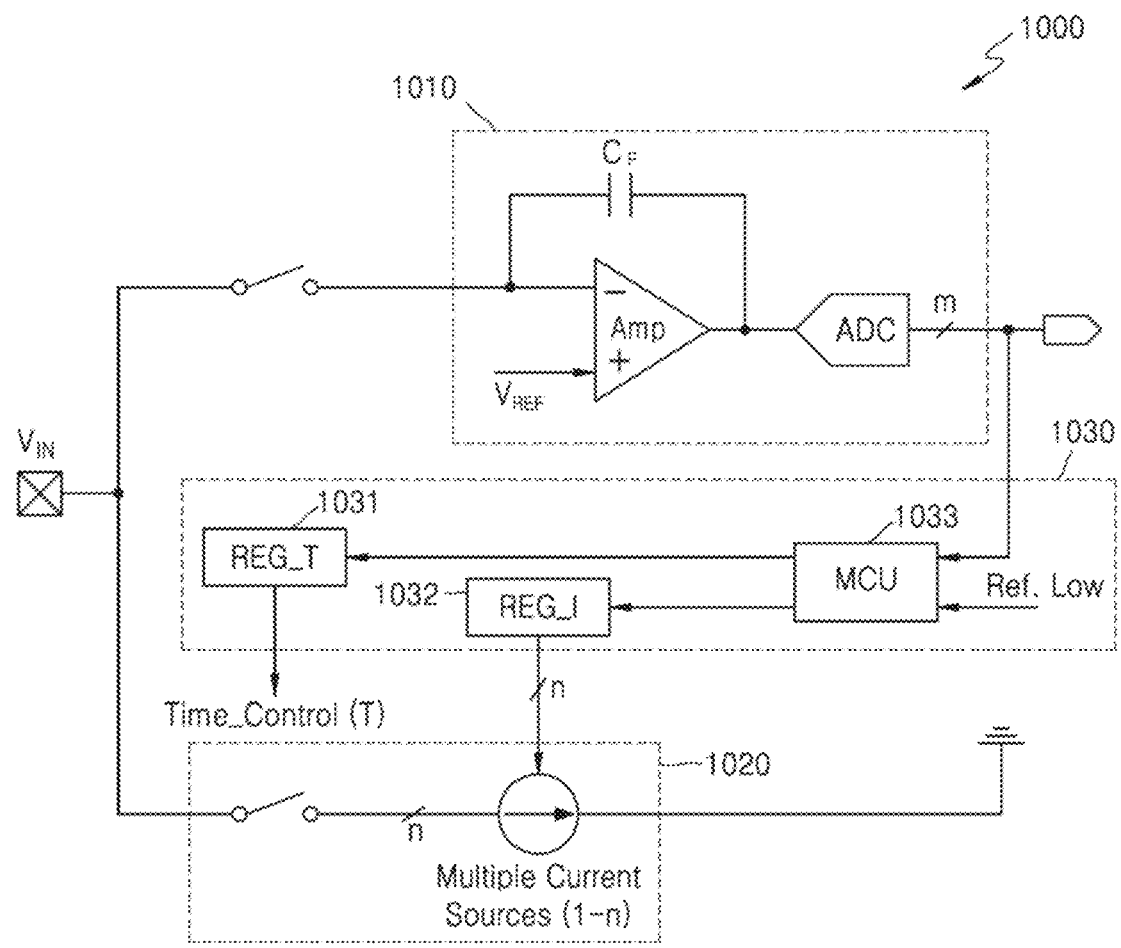
FIG. 10 illustrates another example of a detection circuit included in a receiving circuit according to an example embodiment.

FIG. 10 illustrates another example of a detection circuit 1000 included in a receiving circuit according to an example embodiment.

FIG. 10 illustrates an example of the detection circuit 1000. When the detection circuit 300 of FIG. 3 and the detection circuit 1000 of FIG. 10 are compared with each other, the first part 310 may correspond to a first part 1010, and the second part 320 may correspond to a second part 1020. The first part 1010 may further include an ADC.

The detection circuit 1000 may include a third part 1030, and the third part 1030 may control the operation time of a switch and the current amount of a current source, which are included in the second part 1020. Although FIG. 10 illustrates that the third part 1030 includes a separate processor 1033, and that the processor 1033 controls the operation time of a switch and the current amount of a current source, the disclosure is not limited thereto. When the processor 1033 is omitted in the third part 1030, the above-described functions of the processor 1033 may be performed by the processor 123.

The third part 1030 may include a first register 1031 corresponding to the switch and a second register 1032 corresponding to the current source. Referring to FIGS. 3 to 9, the setting of the operation time of the switch may be stored in the register 1031, and the setting of the current amount of the current source may be stored in the second register 1032. Furthermore, the first register 1031 and the second register 1032 each may be included, as a single configuration, in the third part 1030.

According to the above description, the apparatus 100 may determine the optimal quantity of electric charge for each detection circuit, and set the current amount of the current source and the operation time of the switch according to the determined quantity of electric charge. Accordingly, without a limitation of an integral limit value, the apparatus 100 may perform a sufficient number of integrals with respect to a valid quantity of electric charge needed for generating an image. Accordingly, the apparatus 100 may generate a high quality image of an object detected by the sensor.

Figure 11:
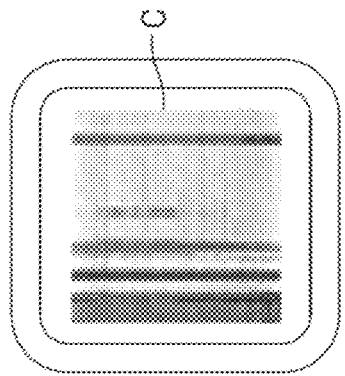
FIG. 11 illustrates a fingerprint image according to an example embodiment and fingerprint images according to comparative examples.
Figure 11:
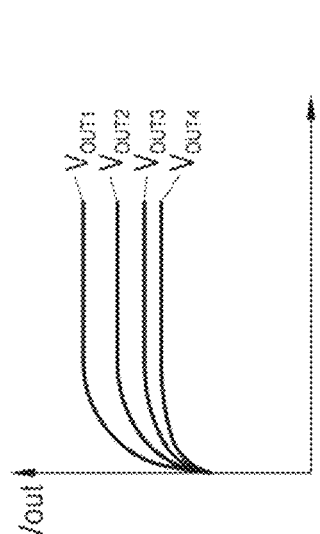
Figure 11:
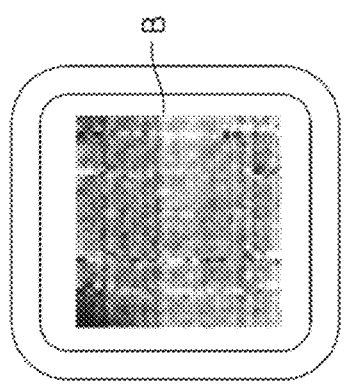
Figure 11:
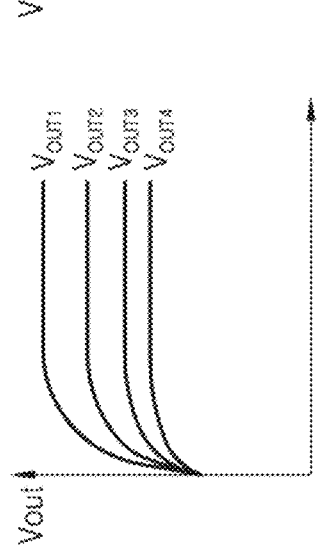
Figure 11:
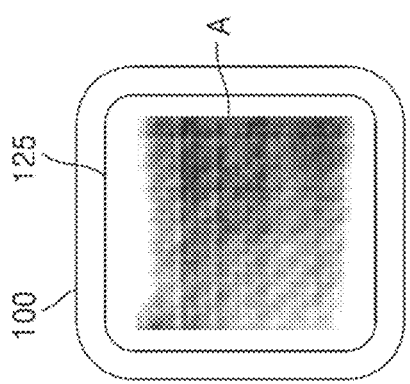
Figure 11:
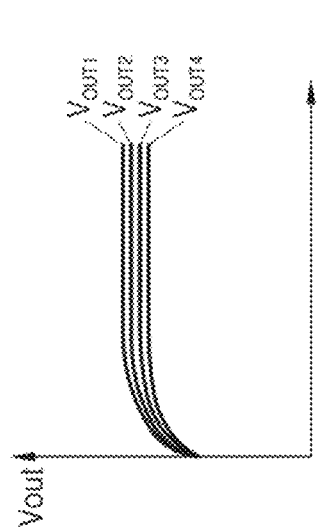

FIG. 11 illustrates a fingerprint image according to an example embodiment and fingerprint images according to comparative examples.

According to an example embodiment, a quantity of electric charge which is to be removed from each of the plurality of detection circuits 300, is optimized for each of a plurality of detection circuits 300 according to an amplifier characteristic (e.g., an input amplifier offset voltage) of each of the plurality of detection circuits 300.

According to comparative example 1, electric charge is not removed from the plurality of detection circuits 300. According to comparative example 2, the same amount of electric charge is removed from each of the plurality of detection circuits 300, without an optimization process.

With reference to the graph of the example embodiment indicating the relationship between the number of integrations and output voltages $V_{OUT1}$-$V_{OUT4}$ that are respectively output from the plurality of detection circuits 300, it is capable to perform a greater number of integrations than comparative examples 1 and 2. Therefore, a higher quality of a fingerprint image may be generated according to the example embodiment than comparative examples 1 and 2.

Also, as shown in FIG. 11, a fingerprint image A that is generated and displayed on the display 125 of the apparatus 100 according to the example embodiment, has a higher resolution than fingerprint images B and C generated and displayed according to comparative examples 1 and 2.

The above-described method can be written as computer programs and can be implemented in general-use digital computers that execute the programs using a computer-readable recording medium. Furthermore, the structure of data used in the above-described method may be recorded on a computer-readable recording medium through various means. Examples of the computer-readable recording medium include magnetic storage media (e.g., ROM, floppy disks, hard disks, etc.), optical recording media (e.g., CD-ROMs, or DVDs), etc.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. An apparatus comprising:
   a fingerprint sensor comprising a plurality of drive electrodes and a plurality of detection electrodes;
   a plurality of detection circuits connected to the fingerprint sensor; and
   at least one processor,
   wherein each of the plurality detection electrodes connected to at least one of the detection circuits,
   wherein each of the plurality of detection circuits comprises:
      a first circuit part including at least one at least one amplifier; and
      a second circuit part including a current source and a switch configured to connect the current source to the plurality of detection circuits according to a control signal, and
   wherein the at least one processor configured to:
      generate the control signal to control at least one of an amount of a current generated from the current source of the second circuit part, and an turn-on time of the switch of the second circuit part;
      obtain an electrical quantity of the first circuit part by removing a quantity of electric charge based on the amount of the current and the turn-on time, from an input of the first circuit part; and
      generate a fingerprint image based on the obtained electrical quantity.

2. The apparatus of claim 1, wherein the at least one processor is further configured to generate the fingerprint image based on comparison between the obtained electrical quantity and a predetermined threshold value, and
   wherein the predetermined threshold value corresponds to an input offset voltage of the amplifier included in the first circuit part.

3. The apparatus of claim 2, wherein the at least one processor is further configured to determine the input offset voltage of the amplifier based on an output value of an analog-digital converter (ADC) included in each of the plurality of detection circuits.

4. The apparatus of claim 2, wherein the at least one processor is configured to determine the quantity of electric charge to be removed such that a first electrical quantity corresponding to the input of the first circuit part is not less than the input offset voltage of the amplifier.

5. The apparatus of claim 4, wherein the at least one processor is further configured to:
   determine a maximum turn-on time during which a first component of the first electrical quantity is not less than the input offset voltage of the amplifier, by increasing the turn-on time of the switch while the amount of the current is fixed;
   determine a maximum current amount of the current source at which the first component is not less than the input offset voltage of the amplifier, by adjusting the turn-on time and the amount of the current; and
   obtain the electrical quantity of the first circuit part by determining the quantity of electric charge based on the maximum turn-on time and the maximum current amount and by removing the quantity of electric charge from the first electrical quantity.

6. The apparatus of claim 4, wherein the at least one processor is further configured to:
   determine a maximum current amount of the current source at which a first component of the first electrical quantity is not less than the input offset voltage of the, by increasing the amount of the current generated from the current source, when the turn-on time of the switch is fixed;
   determine a maximum turn-on time of the switch during which the first component is not less than the input offset voltage, by adjusting the turn-on time of the switch and the amount of the current generated from the current source, and
   obtain the electrical quantity of the first circuit part by determining the quantity of electric charge based on the maximum current amount and the maximum turn-on time, and by removing the quantity of electric charge from the first electrical quantity.

7. The apparatus of claim 2, wherein the at least one processor is further configured to:
   integrate the electrical quantity of the first circuit part to obtain an integrated value, and
   based on the integrated value being greater than or equal to the predetermined threshold value, repeat at least once an operation of controlling the amount of the current and the turn-on time and the an operation of integrating the electrical quantity of the first circuit part.

8. The apparatus of claim 2, wherein the predetermined threshold value represents a signal-to-noise ratio of each of the plurality of detection circuits.

9. An electronic apparatus comprising:
   a fingerprint sensor comprising a plurality of drive electrodes and a plurality of detection electrodes; and
   an electronic circuit comprising a plurality of detection circuits and at least one processor, wherein the plurality of detection circuits connected to the fingerprint sensor,
wherein each of the plurality detection electrodes connected to at least one of the detection circuits,
wherein each of the plurality of detection circuits comprises:
 a first circuit part including at least one at least one amplifier; and
 a second circuit part including a current source and a switch configured to connect the current source to the plurality of detection circuits according to a control signal, and
wherein the at least one processor configured to:
 generate the control signal to control at least one of an amount of a current generated from the current source of the second circuit part, and an turn-on time of the switch of the second circuit part;
 obtain an electrical quantity of the first circuit part by removing a quantity of electric charge based on the amount of the current and the turn-on time, from an input of the first circuit part; and
 generate a fingerprint image based on the obtained electrical quantity.

\* \* \* \* \*